United States Patent

Webb

[15] 3,702,898

[45] Nov. 14, 1972

[54] ELECTRONIC VIDEO EDITOR

[72] Inventor: Darrow L. Webb, Cocoa, Fla.

[73] Assignee: The United States of America as represented by the Administrator of the National Aeronautics and Space Administration

[22] Filed: Aug. 4, 1970

[21] Appl. No.: 60,883

[52] U.S. Cl...................178/6, 178/DIG. 6, 307/242, 307/259, 328/104, 328/154

[51] Int. Cl...........................H04n 5/22, H03k 17/74

[58] Field of Search..........178/DIG. 6; 328/104, 154; 307/242, 243, 244, 259

[56] References Cited

UNITED STATES PATENTS

| | | | |
|---|---|---|---|
| 3,158,692 | 11/1964 | Gerrensmeier | 328/154 |
| 3,034,065 | 8/1962 | Coleman | 328/154 |
| 3,519,739 | 7/1970 | Seim | 178/6.8 |
| 3,047,741 | 7/1962 | Snow | 307/259 |
| 2,866,092 | 12/1958 | Raunsford | 328/154 |
| 2,464,353 | 3/1949 | Smith | 178/DIG. 6 |

*Primary Examiner*—Robert L. Griffin
*Assistant Examiner*—Joseph A. Orsino, Jr.
*Attorney*—James O. Harrell and John R. Manning

[57] ABSTRACT

An electronic video editor for switching any one of a plurality of video input signals to a common output channel. The switching operation is manually initiated and electronically controlled so that the switching from one video input signal to another takes place during the blanking portion of the signal in order that frames of the picture are not lost.

1 Claim, 2 Drawing Figures

Figure 1:
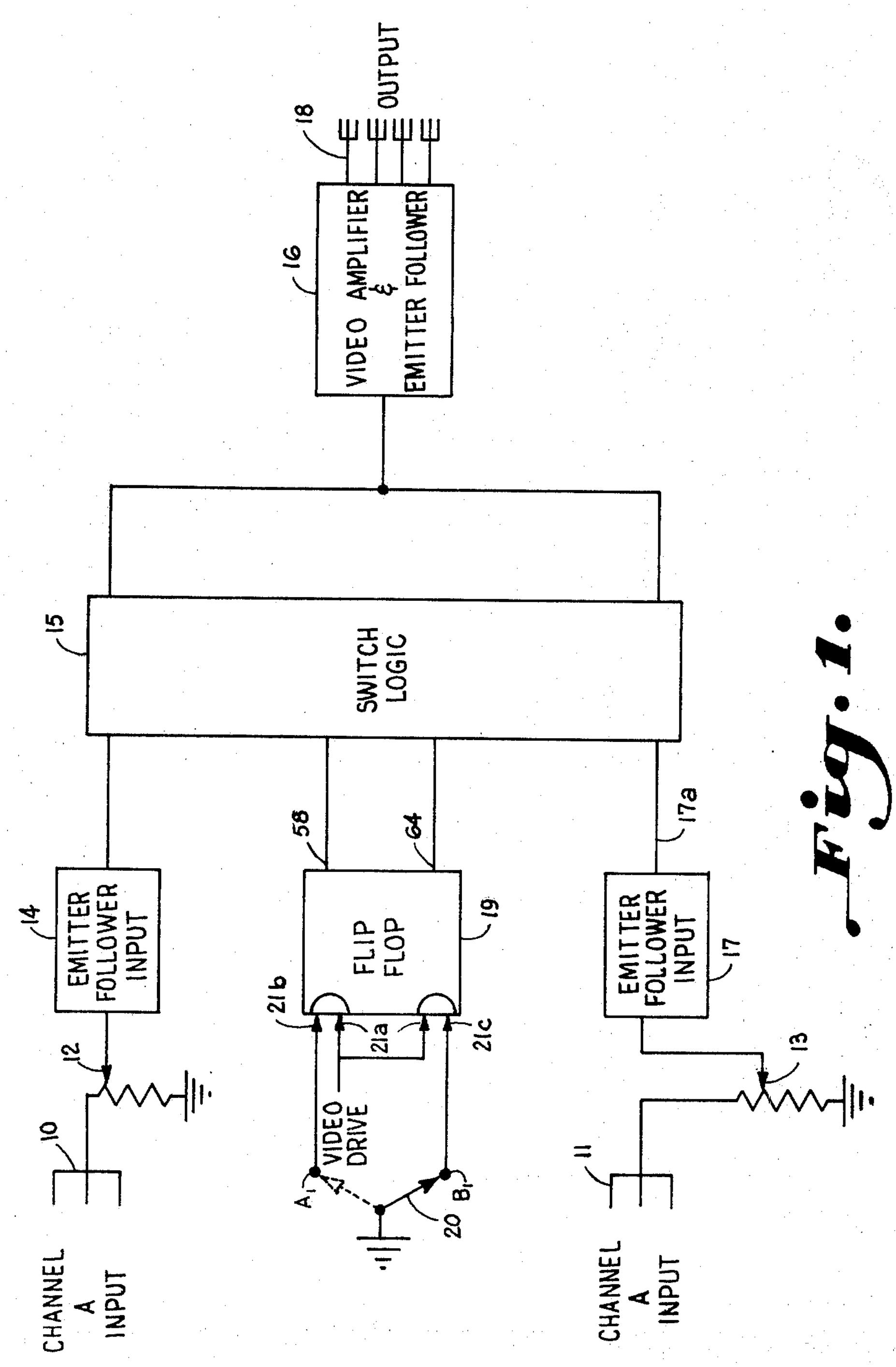

INVENTOR.
DARROW L. WEBB

BY *James O. Harrell*

ATTORNEY

INVENTOR.
DARROW L. WEBB
BY James O. Harrell
ATTORNEY

ELECTRONIC VIDEO EDITOR

The invention described herein was made by an employee of the United States Government, and may be manufactured and used by or for the Government for Governmental purposes without the payment of any royalties thereon or therefor.

The invention relates to an electronic video editor wherein an operator can manually switch from one channel of incoming video input signals to another channel without interrupting any frames of the video signals.

In monitoring various items, such as space vehicles, frequently a pair of cameras are used. When it is desired to make a single composite record of the launching the best video picture produced by these cameras is used. Heretofore, the editor would observe both of the video signals or pictures and manually switch from one signal to the other so as to place the best picture on the composite record. One problem encountered is that during the switching operation frames of pictures are lost and sometimes the synchronism is lost, producing an inferior composite record.

It is desired to have a record wherein the best of two signals is recorded on a composite record with no interruptions as a result of switching from one channel to the other.

In accordance with the present invention, it has been found that difficulties encountered in editing a pair of video signals in order to produce a composite tape can be overcome by providing a novel video editor. This video editor, when used for editing a pair of video input signals by selectively switching from any one of the pair of video input signals to a common output channel, includes the following basic parts: (1) a plurality of input video channels each having a video signal thereon, (2) a single output channel, (3) a switching circuit coupled to the input channels and the output channel for selectively feeding a video signal from a particular input channel to an output channel, (4) a switching circuit including a gating means interposed between each of the input channels and the output channel, (5) a flip-flop having a pair of output terminals, a pair of input terminals, and a trigger input, in which the output terminals are coupled to a respective gating means, (6) a manually operated switch coupled to the input terminals of the flip-flop for selecting the desired state of the flip-flop wherein the flip-flop provides a signal on a particular output terminal to deactivate a gating means coupled thereto and activate a gating means coupled to the other output terminal, (7) a source of sync signals phase-locked to the video signals for providing switching synchronism with the vertical blanking interval, (8) means for supplying the sync signal to the trigger input of the flip-flop for enabling the flip-flop to change state only when the vertical blanking portion of the video signal is present, (9) whereby a manually operated switch can be manipulated for switching from one video channel to another during the blanking portion of the signal.

Accordingly, it is an important object of the present invention to provide an electronic video editor wherein the operator can manually switch from one channel to another to produce a composite signal that does not show any interruptions during the switching operation.

Another important object of the present invention is to provide a simplified switching circuit for switching channels of video signals.

Still another important object of the present invention is to provide an electronic switching device for switching from one video input signal to another during the blanking portion of the video input signal.

Another important object of the present invention is to provide an electronic switching device wherein, the operator can manually switch from one channel to another, but the actual switching operation is delayed until such can take place during the blanking portion of a signal so that no interruption of the composite signal is produced.

Figure 2:
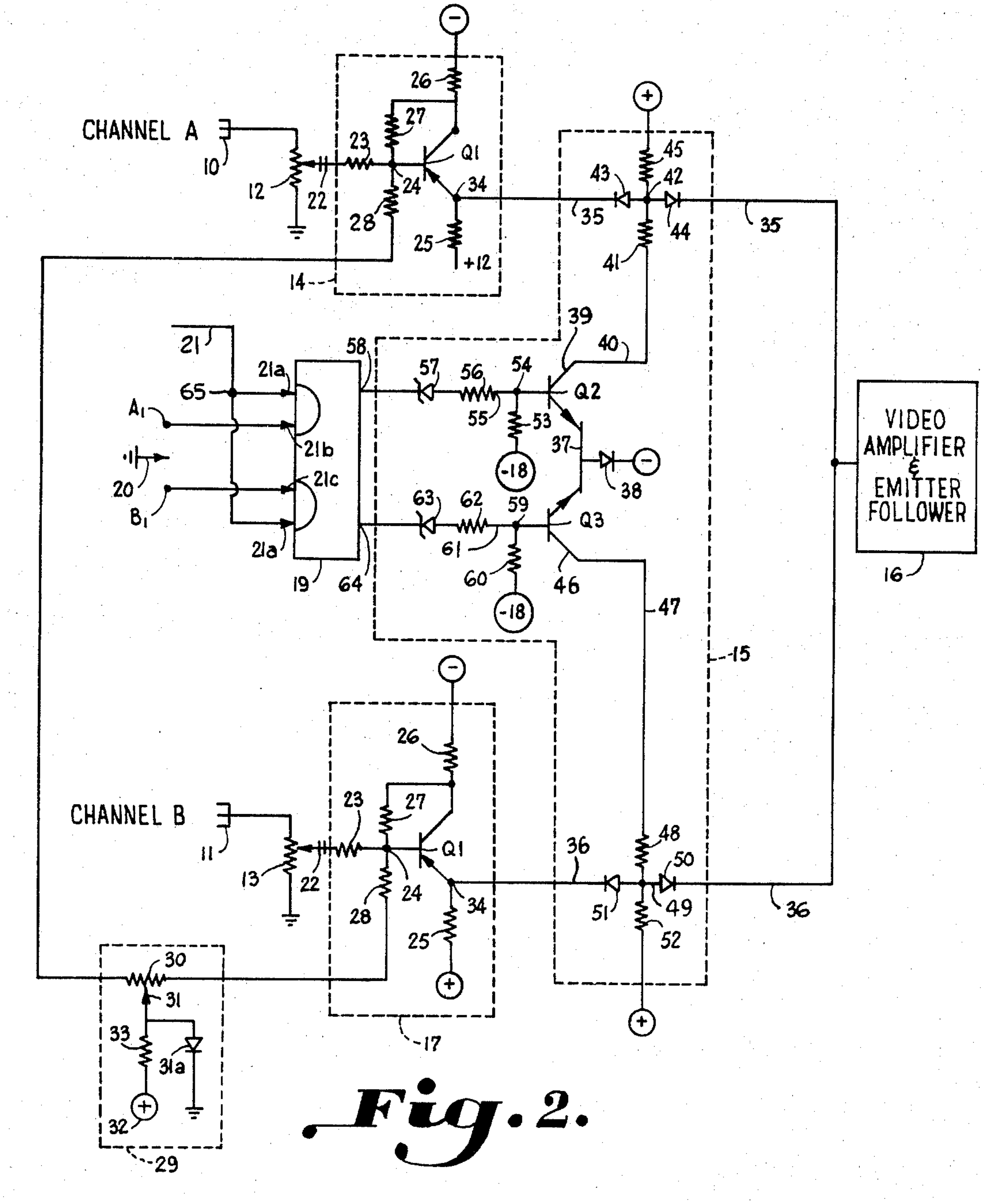

Other objects and advantages of this invention will become more apparent from a reading of the following detailed description and appended claims, taken in conjunction with the accompanying drawing wherein:

FIG. 1 is a block diagram illustrating the electronic video editor which is used for switching from one channel to another video channel, and FIG. 2 is a schematic diagram, a portion of which is in block form, of the electronic switching video editor illustrated in FIG. 1.

Referring in more detail to FIG. 1, there is illustrated schematically a pair of sources 10 and 11 of video input signals. The incoming video signals pass through gain control potentiometers 12 and 13, respectively, so that adjustments can be made to equalize the signals coming in on the two channels A and B, respectively. The signal coming in on channel A then passes through an emitter follower 14, through a switch logic circuit 15, to any suitable conventional buffer, such as a video amplifier and emitter followers 16. The signal coming in on channel B follows a similar path through an emitter follower 17, line 17*a*, the switch logic circuit 15, into the same video amplifier and emitter followers 16 for for producing a composite signal on the output terminals 18 thereof. It is desired that only a single video picture be fed to the video amplifier and emitter follower 16 at a time. Therefore, a switching arrangement is provided for allowing either signals from channel A or signals from channel B to pass through the switch logic circuit 15 to the output circuitry 16. This switching circuit 15 is controlled by a flip-flop 19 which has a manual enable switch 20, which when positioned to the $A_1$ terminal, energizes flip-flop 19 to allow the signals coming in through source 10 of channel A to pass through the logic switch 15 to the video amplifier, and emitter follower 16. When the manual switch 20 is in contact with terminal $B_1$ such enables the flip-flop 19 to change state wherein the switch logic circuit 15 allows the signals coming in from channel B to pass to the video amplifier and emitter follower 16. The flip-flop does not allow the switching action to take place until the blanking portion of the next signal is received. This prevents any interruptions of the video signal being recorded or being supplied to the video amplifiers and emitter follower 16. As can be seen, a sync signal is fed into flip-flop 19, over lead 21, to a trigger input 21a of the flip-flop. This sync signal comes from any suitable sync generator that is phase-locked with the incoming signals on channels A and B.

In summarizing the operation of the block diagram illustrated in FIG. 1, when the operator desires the picture coming in on the particular channel to be fed to the output video amplifier 16 he manually shifts the enable switch 20 to either the $A_1$ or $B_1$ position. Assuming that the picture coming in on channel B is the desired picture, he will place the switch in the position shown in FIG. 1. The flip-flop does not change state instantaneously but waits until the sync signal coming in on lead 21 indicates that the blanking portion of the signal has been received. At this point the flip-flop changes state and allows the switching circuit 15 to permit the signal coming in on channel B to pass therethrough to the video amplifier 16. If in a few moments the operator desires to place the signal coming in on channel A on the output amplifier 16, he merely switches the enable switch 20 to the $A_1$ position. When the next vertical blanking portion of the signal coming in on channel A arrives such allows the flip-flop 19 to change state enabling the switching circuit 15 to allow the signal coming in on channel A to pass to the video amplifier 16 and block the signal coming in on channel B.

Referring in more detail to FIG. 2, the signals coming in on the sources 10 and 11, respectively, are fed through gain control potentiometers 12 and 13, respectively. Since the internal portion of the emitter followers 14 and 17 are identical, only one will be discussed and the same reference characters are used for the internal components.

The signal coming from gain control potentiometers 12 and 13 are passed through a coupling capacitor 22, resistor 23, to junction 24, which is in turn connected to the base electrode of PNP transistor Q1. The emitter electrode of PNP transistor Q1 is connected through resistors 25 to a positive potential. The collector electrode is connected through resistor 26 to a negative potential. Also, connected to junction 24 is a voltage dividing network which includes resistors 27 and 28. Resistor 28 is connected between junction 24 and a D.C. balance circuit, generally designated by the reference character 29. The purpose of the D.C. balance circuit 29 is to maintain the emitter potential of transistor Q1 and the emitter follower 17 equal to the emitter potential of the transistor Q1 included in the emitter follower 14. This D.C. balance circuit includes a variable resistor 30 which is interposed in a lead extending between resistor 28 of emitter follower 17 and resistor 28 of emitter follower 14. A wiper arm 31 is coupled to the variable resistor 30 and has connected thereto, the anode of a silicon diode 31*a* whose cathode is connected to ground. Also, connected to the wiper arm 31 is a positive potential 32 which is coupled thereto through resistor 33.

The signal appearing on the emitter junction 34 of either the emitter follower circuits 14 or 17 is fed by a respective lead 35 or 36 into the switch logic circuit 15.

The switching circuit 15 includes a pair of NPN transistors Q2 and Q3. The emitter electrode of transistor Q2 is connected through lead 37 to the emitter electrode of transistor Q3. It is noted that lead 37 is connected by means of diode 38 to a negative potential. The collector electrode 39 of transistor Q2 is connected via lead 40, resistor 41, to junction 42, interposed in lead 35. Connected in a back-to-back relationship to junction 42 are diodes 43 and 44, respectively. A positive potential is also connected to junction 42 through resistor 45. The diodes 42 and 43 each have their anodes connected to junction 42. The collector electrode 46 of transistor Q3 is connected by means of lead 47, through resistor 48, to junction 49, interposed in lead 36. A similar set of switching diodes are interposed in lead 36. Diodes 50 and 51 which are interposed in lead 36 each have their anodes connected to junction 49. Also, connected to junction 49 through resistor 52 is a positive potential.

The base electrode of transistor Q2 is connected to a negative potential of 18 volts through resistor 53, which has its other side coupled to junction 54 interposed in lead 55 connected to the base electrode. Another resistor 56 is interposed in lead 55 and is connected to junction 54. The other side of resistor 56 is connected to a zener diode 57 to one output terminal 58 of the flip-flop 19. The base electrode of transistor Q3 is connected to junction 59. Also, connected to junction 59 through resistor 60 is a negative potential of 18 volts. Lead 61 extends from the other side of junction 59 and has interposed therein a resistor 62 and a zener diode 63 which has its cathode coupled to the other output 64 of the flip-flop 19.

The flip-flop 19 can be any suitable conventional flip-flop which has an A.C. trigger input 21*a* and two D.C. control inputs 21*b* and 21*c* for the set and reset sides. For reference purposes, when there is an output on lead 58 such will be referred to as the set side, and when there is an output on lead 64 such will be referred to as the reset side. The flip-flop 19 has a pair of A.C. trigger inputs 21a which are coupled together at junction 65. Junction 65 is, in turn, connected to lead 21 for receiving the vertical drive from a suitable sync generator that is phase-locked with the incoming video signals coming in on channels A and B. The flip-flop 19 also has a pair of D.C. control inputs 21*b* and 21*c*. D.C. control input 21*b* is coupled to the $A_1$ input terminal associated with the switch arm 20, whereas, D.C. input terminal 21*c* is coupled to the $B_1$ input terminal associated with the manual switch arm 20.

In operation, assume that the signal coming in on channel B is the desired signal that is to be received by the video amplifier 16. The operator manually switches the contact arm 20 to terminal $B_1$. This causes the flip-flop 19 on the next blanking signal coming in on the lead 21 to switch to the reset position if such were in the set position. When flip-flop 19 is flipped to the reset position the output on output terminal 64 goes negative. When output terminal 64 goes negative the potential at junction 59 goes towards the negative potential on the emitter electrode of Q3 turning off transistor Q3. When transistor Q3 turns off the potential at junction 49 goes towards the positive potential coupled through resistor 52 and forward biases the switching diodes 50 and 51. This allows the signal on junction 34 to pass through line 36 through the switching diodes 50 and 51 to the output video amplifier 16.

At the same time that output terminal 64 goes negative output terminal 58 goes to a ground potential. This causes the potential at junction 54 to go more positive than the potential on lead 37 turning on transistor Q2. When transistor Q2 turns on junction 42 goes to a more negative potential reverse biasing diodes 43 and 44,respectively, preventing any signal at junction 34 of transistor Q1 in the emitter follower 14 from passing via lead 35 to the video amplifier 16. When the manual switch 20 is flipped to the $A_1$ terminal the exact opposite happens allowing the signals coming from channel 10 over lead 35 to pass to the video amplifier 16, while preventing the signals coming in on channel 11 over lead 36 to pass to the video amplifier.

Therefore, even though the switching from one channel to another is manually controlled such action does not take place except during the vertical blanking portion of the signal.

While a preferred embodiment of the invention has been described using specific terms, such description is for illustrative purposes only, and it is to be understood that changes and variations may be made without departing from the spirit or scope of the following claims.

I claim:

1. An electronic video editor for switching any one of a pair of video input signals to a common output channel comprising:

A. a pair of video input channels each having a video signal thereon;

B. a single output channel;

C. a switching circuit including a pair of gating means;

D. each of said gating means including a pair of back to back diodes coupling a respective input channel to said output channel said channel including an emitter follower;

E. an emitter follower coupled between each of said channels and said respective gate means coupled thereto;

F. a voltage source;

G. a balance circuit coupled between said voltage source and said emitter followers;

H. said balance circuit including a variable resistor for maintaining the voltage applied to said emitter followers substantially equal;

I. a pair of transistors each having a base, emitter, and collector electrode;

J. means for connecting said collector electrode of a respective transistor between said back to back diodes of a respective gating means for deactivating said gating means when said respective transistor is turned on;

K. a flip-flop having a pair of input terminals, a pair of output terminals and a trigger input;

L. means for connecting including a zener diode each of said output terminals to a base electrode of a respective transistor for turning said respective transistors on when there is a signal present on the output terminal;

M. a source of sync signals phase-locked to said video signals for providing a signal during the blanking portion of said video signal;

N. a manually operable switch coupled to said input terminals of said flip-flop capable of being switched to select a desired state of said flip-flop wherein an output signal is on one or the other output terminals, and O. means for connecting said source of sync signals to said trigger terminal causing said flip-flop to change state responsive to said manually operable switch being switched from one state to another during the blanking portion of said video signal;

P. whereby an operator can switch from one video channel to another and such switching operation only takes place during the blanking portion of said signal.

* * * * *